United States Patent [19]

Hirakawa et al.

[11] 4,349,061
[45] Sep. 14, 1982

[54] PNEUMATIC RADIAL TIRES FOR PASSENGER CARS HAVING A LOW ROLLING RESISTANCE

[75] Inventors: Hiroshi Hirakawa, Musashino; Akio Sato, Higashimurayama; Takashi Takusagawa, Ohme; Nobumasa Ikeda, Kodaira, all of Japan

[73] Assignee: Bridgestone Tire Company Limited, Tokyo, Japan

[21] Appl. No.: 179,197

[22] Filed: Aug. 18, 1980

[30] Foreign Application Priority Data

Sep. 1, 1979 [JP] Japan .................................. 54/111038

[51] Int. Cl.³ ...................... B60C 13/00; B60C 15/06; B60C 1/00
[52] U.S. Cl. ............................ 152/209 R; 152/353 R; 152/360; 152/362 R; 152/374
[58] Field of Search ............... 152/330 R, 360, 362 R, 152/374, 209 R, 353

[56] References Cited

U.S. PATENT DOCUMENTS

| 1,769,694 | 7/1930 | Jenkinson | 152/374 |
| 3,157,218 | 11/1964 | Brown | 152/330 R |
| 4,250,939 | 2/1981 | Shibata et al. | 152/362 R |
| 4,274,462 | 6/1981 | Ogawa et al. | 152/209 R |

FOREIGN PATENT DOCUMENTS 53-4059  1/1978  Japan .............................. 152/362 R
1067856  5/1967  United Kingdom ................ 152/360

OTHER PUBLICATIONS

Ambelang, "Compositional Variables Affecting Dynamic Properties of Tire Compounds", Journal of Elastomers & Plastics, vol. 9 (Oct. 1977), pp. 384–394.

Primary Examiner—Edward C. Kimlin
Assistant Examiner—Lois E. Boland
Attorney, Agent, or Firm—Sughrue, Mion, Zinn, Macpeak & Seas

[57] ABSTRACT

A pneumatic radial tire for passenger cars having a low rolling resistance is disclosed. The radial tire comprises a body reinforcement including a toroidal carcass composed of radially arranged cords and a belt superimposed about the carcass and consisting of plural rubberized plies each containing cords arranged at 60°–80° with respect to the radial plane of the tire, which cords of said plies being crossed with each other, and a bead reinforcement wherein the carcass is wound around a bead core to form a turnup portion, thread and sidewall rubbers covering these reinforcements. In the radial tire, a super-hard bead filler rubber is arranged at a region extending from the bead core to the middle part of the side portion, and a base rubber having a low loss modulus and a high resilience is arranged on at least both side edge parts of the belt at a volume ratio in the coating rubber for tread portion of 0.1–0.5.

10 Claims, 1 Drawing Figure

U.S. Patent
Sep. 14, 1982
4,349,061
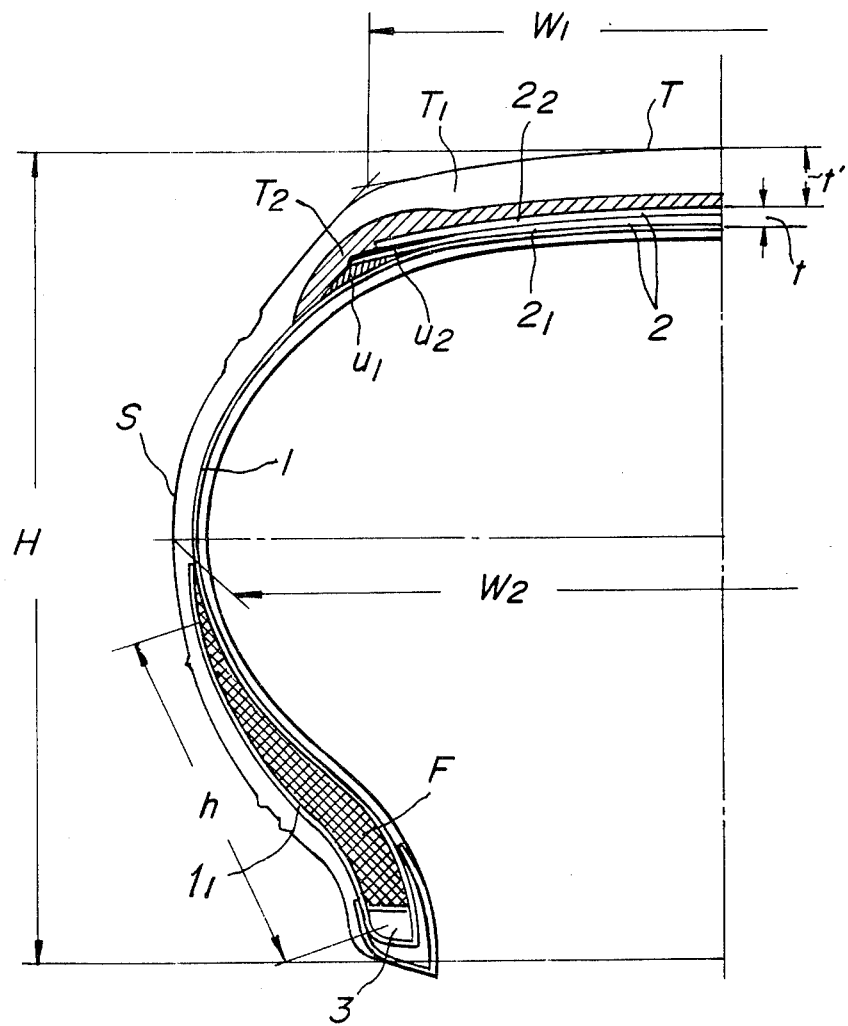

PNEUMATIC RADIAL TIRES FOR PASSENGER CARS HAVING A LOW ROLLING RESISTANCE

This invention relates to pneumatic radial tires for passenger cars having a low rolling resistance.

In general, the pneumatic radial tire of this type comprises a body reinforcement including a toroidal carcass composed of radially arranged cords and belt superimposed about the carcass and consisting of plural rubberized plies each containing cords arranged at an inclination angle of 60°–80° with respect to a radial plane of the tire, which cords of said plies being crossed with each other, and a bead reinforcement wherein the carcass is wound around a bead core to form a turnup portion. Further, the pneumatic radial tire is usually manufactured by one-piece vulcanization molding of a tread rubber and a sidewall rubber covering these reinforcements.

The belt consists of plural rubberized plies each containing, for example, rigid steel cords and locates between the tread rubber and the carcass, so that it contributes to the improvement of tire performances, particularly wear resistance, puncture resistance and cornering stability as well as the reduction of fuel consumption in the passagener car and the like. On the other hand, the flexural rigidity of the tread portion is considerably high owing to the presence of the belt, so that a shock produced by riding over projections on road surface during the running of the tire, vibration produced by unbalance inevitable to the tire itself and the like are transmitted from the bead portion to a rim wheel without being absorbed by the side portion. This is apt to cause a vibration of a vehicle body or a deterioration of a so-called ride feeling performance against vibration (hereinafter referred to as ride feeling).

In this connection, it has been confirmed that the effective damping of the aforementioned vibration can be realized by disposing a super-hard bead filler rubber having a shore A hardness of 80°–95° in a region extending from the turnup portion of the carcass around the bead core to a substantially middle part of the side portion without obstructing the cornering stability. In this case, the suitable bead filler rubber has the following composition.

That is, the bead filler rubber is prepared by compounding 5–30 parts by weight, preferably 8–30 parts by weight, more particulary 15–25 parts by weight of a thermoset resin and 0.5–5 parts by weight of a curing agent for thermoset resin such as hexamethylene tetramine or the like with 100 parts by weight of a sulfur-vulcanizable rubber selected from the group consisting of natural rubber, diene rubbers, diene compolymer rubbers and rubber blends thereof with an optional blending ratio and optionally adding usual compounding ingredients such as reinforcer, filler, antioxidant, vulcanization accelerator, activator, softener, plasticizer, tackifier, peptizer and the like thereto, if necessary, and has a dynamic modulus of at least 300 kg/cm$^2$, preferably more than 500 kg/cm$^2$, more particularly 700–1,500 kg/cm$^2$. As the thermoset resin, mention may be made of phenol resin, cresol resin and modified resins thereof with an optional modifying ratio such as cashew modified phenol resin, cashew modified cresol resin, cresol modified phenol resin, phenol or cresol resin modified with an oil of linoleic acid, linolenic acid, oleic acid or the like, phenol or cresol resin modified with an alkylbenzene such as xylene, mesitylene or the like, phenol or cresol resin modified with rubber such as nitrile rubber or the like.

Lately, it has also been confirmed that the super-hard bead filler rubber not only is effective for the improvement of the ride feeling, but also may serve to reduce the rolling resistance of the tire because of the tire weight saving by thinning of the rubber gauge in the side portion while holding the concerning stability.

Since the rolling resistance of the tire directly influences on the driving force of the vehicle, it is considered important in the tire industry to further reduce the rolling resistance for energy resource savings.

The inventors have made investigations to further reduce the rolling resistance up to a limit of low fuel consumption tire under the weight saving of the tire resulting from the development of the above mentioned super-hard bead filler rubber. As a result, the invention has been accomplished.

Of course, the wear resistance and cornering stability should be established together with the ride feeling, particularly antiskid property on wet road surface (hereinafter merely referred to as skid resistance), which are usually conflicting conditions against the former, without any obstructions in the tire performance.

It is, therefore, an object of the invention to advantageously obtain the extreme reduction of the rolling resistance without losing the overall balance of the above mentioned tire performances.

According to the invention, it is possible to sufficiently achieve the above object by thoroughly investigating the influence of the tread rubber on the rolling resistance, on the premise that the aforementioned super-hard bead filler rubber is used to attain the maintenance of the cornering stability and the improvement of the ride feeling, resulting in the weight saving of the tire, to thereby improve the cornering stability and at the same time serve to reduce the rolling resistance.

In the tread rubber, it is self-evident that the rubber composition having a high resilience is advantageous for the reduction of the folling resistance. Up to now, rubber compositions satisfying the establishment of such conflicting performances have never been found from may experiments. According to the invention, however, it has been discovered that the reduction of the rolling resistance can advantageously be obtained by making the tread portion into a cap-base structure, wherein the base rubber is a high resilience rubber, without exerting upon the skid resistance. As a result of many experiments based on the above discovery, it has been found out that the high resilience rubber is effectively suitable when it is arranged on at least both side edge parts of the belt superimposed about the carcass and has particularly a low loss modulus as a rubber property, and that when the volume ratio of the above rubber in the tread rubber is within a range of 0.1–0.5, the reduction of the rolling resistance is advantageously realized without deteriorating the skid resistance over a tread wear life during the use of the tire.

Throughout the specification, the rubber arranged on the belt is called a base rubber.

When the volume ratio of the base rubber in the tread rubber is less than 0.1, the object of the invention aiming at the reduction of the rolling resistance is not achieved, while when the volume ratio exceeds 0.5, the base rubber is exposed to a tread surface in the course of the tire use life, which adversely affects the skid resistance.

Among the properties of the base rubber, the loss modulus and resilience mainly contribute to the reduction of the rolling resistance. Therefore, the base rubber is preferable to have a loss modulus of 2–12 kg/cm$^2$ and a resilience of 60–85%. When the loss modulus exceeds 12 kg/cm$^2$, the reduction of the rolling resistance is not attained, while when the loss modulus is less than 2 kg/cm$^2$, the ride feeling is considerably deteriorated to such an extent that the deterioration of the ride feeling cannot be compensated by the super-hard bear filler rubber and the thinning of the rubber gauge in the side portion resulted therefrom.

When the resilience is less than 60%, the reduction of the rolling resistance is not attained, while when the resilience exceeds 85%, the ride feeling becomes uncomfortable.

The most effective action of the base rubber is obtained by arranging the base rubber on both side edge parts of the belt, but the base rubber may extend over the whole of the belt toward its widthwise direction to form a tread rubber of so-called cap-base structure for the convenience of a doubling step for the formation of green case or its preliminary step.

The rolling resistance of the tire according to the invention is considerably reduced by satisfying all of the above requirements, i.e. by the weight-saving of the tire due to the thinning of the rubber gauge in the side portion and the arrangement of the base rubber on at least both side edge parts of the belt as a tread rubber without actually exerting a bad influence upon the skid resistance of the tire and also by the arrangement of the super-hard bead filler rubber having a Shore A hardness of 80°–95°, which brings about the thinning of the rubber gauge in the side portion as well as the improvement of the ride feeling, without reducing the cornering stability of the tire, whereby the fuel consumption of the vehicle from the decreased rolling resistance of the tire can effectively be suppressed.

In the pneumatic radial tire, a belt-under cushioning member is usually arranged between the belt and the carcass just beneath each side edge part of the belt resulting from the carcass-belt reinforcing structure. Therefore, a rubber having the same properties as in the base rubber is used as the cushioning member, which is advantageous and practically desirable for the further reduction of the rolling resistance.

BRIEF DESCRIPTION OF THE DRAWING

The invention will now be described in detail with reference to the accompanying drawing, wherein:

The single FIGURE is a schematic radial half section of an embodiment of the pneumatic radial tire according to the invention.

This FIGURE shows a concrete embodiment of the pneumatic radial tire having a low rolling resistance and a tire of 185/70 SR 13 4PR according to the invention, wherein numeral 1 is a carcass, numeral 2 a belt and numeral 3 a bead core.

The carcass 1 is one ply composed of organic fiber cords such as polyester fiber cords of 1,500 d/2, which are arranged in substantially a radial construction (at an angle of about 0° with respect to the radial plane of the tire at the tread center) according to the usual manner. In some cases, the carcass may be two or more plies in compliance with the load conditions, tire size and the like.

In the illustrated embodiment, the belt 2 consists of a first rubberized cord ply $2_1$ and a second rubberized cord ply $2_2$, these cords of the plies being crossed with each other at an angle of 73° with respect to the radial plane of the tire, wherein the first ply $2_1$ is slightly wider than the second ply $2_2$ and extends substantially over a tread width $W_1$.

The treach width $W_1$ is determined so that a ground contact width of the tread portion corresponds to about 62% of a maximum width W of the tire. This ground contact width is selected from a range of 50–70% giving a best result for the rolling resistance as a result of many experiments.

The bead core 3 reinforces a bead portion inclusive of a region extending toward a substantially middle part of the side portion together with a super-hard bead filler rubber F sandwiched between an inner surface of a turnup $1_1$ of the carcass 1 wound around the bead core from inward to outward and an outer surface of the carcass 1.

In the illustrated embodiment, the bead filler rubber F has a Shore A hardness of 94° and a height h of 60 mm, and its thickness is gradually increased toward the base contacting with the bead core, whose maximum thickness is about 6.5 mm. Moreover, the height H of the tire is 133 mm.

Although the bead filler rubber F is enclosed with the top of the turnup $1_1$ of the carcass in the illustrated embodiment, the top of the turnup $1_1$ may also be lowered from the top of the bead filler rubber F. In the latter case, a proper another reinforcing layer may be added near the turnup $1_1$.

The bead filler rubber F is rendered super-hard according to a compounding recipe as mentioned below with the aforementioned composition, whereby the total gauge of the rubber for side portion S and the bead filler rubber F can be reduced by about 20% without particular difficulties for workability and others and with the holding of the cornering stability and proper ride feeling, which are required for the tire of this type, and as a result, it is expected to reduce the weight of the tire by about 5%.

In the illustrated embodiment, the rubber for tread portion T is particularly a cap-base structure, wherein a cap rubber $T_1$ has a Shore A hardness of 64° and a resilience of 38% with a compounding recipe as mentioned below in order to advantageously satisfy the requirements for wear resistance and skid resistance of the tire, and a base rubber $T_2$ is disposed on the upper surface of the belt 2 and completely extends over the whole of the belt toward the widthwise direction thereof, i.e. over 120% of the belt width, and has a volume ratio in the rubber for tread portion T of 0.3, a Shore A hardness of 59° and a resilience of 70%.

Moreover, it is desirable to thin the rubber for tread portion T as far as possible in order to reduce the rolling resistance desired by the invention under the tire weight saving, but the total thickness of the tread rubber is restricted in view of the wear durability and is necessary to be 2.5–3.5 times of a total t of the belt 2. In the illustrated embodiment, t is 3.1 mm and the total thickness t' of the tred rubber is 0.3 mm at the tread center. In the figure, symbol $U_1$ and $U_2$ represent belt-under cushioning members, respectively.

The compounding recipe of the rubber composition in the main parts of the tire is shown in the following Table 1.

TABLE 1

| Compounding recipe (part by weight) | Bead filler | Cap | Base |
| --- | --- | --- | --- |
| Natural rubber | 100 | — | 80 |
| Styrene-butadiene copolymer rubber | — | 80 | — |
| Polybutadiene rubber | — | 20 | 20 |
| Carbon black ISAF | — | 75 | — |
| HAF | 75 | — | 38 |
| Phenol resin | 24 | — | — |
| Aromatic oil | 5 | 35 | 4 |
| Sulfur | 6 | 1.8 | 2.5 |
| Hardness (Shore A, °) | 94 | 64 | 59 |
| Resilience (%) | 45 | 38 | 70 |
| Loss modulus (kg/cm$^2$) | — | 30 | 8 |
| Dynamic modulus (kg/cm$^2$) | 980 | — | — |

Note:
The resilience is measured by subjecting a rubber sample of 8 mm × 8 mm × 4 ± 0.1 mm to a Dunlop tripsoresilience tester of B.S. Standard No. 903, which is made by Toyo Seiki Seisakusho, at room temperature under a hammer weight of 60 g. The loss modulus is calculated from a loss tangent and a dynamic modulus, which are measured by subjecting a strip rubber sample of 5 mm width × 2 mm thickness to a viscoelastic spectrometer made by Iwamoto Seisakusho at 25° C. under a frequency of 50 Hz and a dynamic strain of 1%.

Three tires were prepared, i.e. a tire A according to the above embodiment, a tire B having the same construction as described in the tire A except that the tread portion is composed of a single rubber having a loss modulus of 18 kg/cm$^2$ and resilience of 60% to equalize the rolling resistance to the level of the tire A without using the base runbber, and a tire C having the same construction as described in the tire A except that the conventional bead filler rubber having a Shore A hardness 75° and a height of 70 mm is used instead of the super-hard bead filler rubber.

Then, the rolling resistance, cornering stability, skid resistance and ride feeling were evaluated with respect to these three tires to obtain results as shown in the following Table 2. The measurement is performed as follows:

Rolling resistance

The test tire subjected to an internal pressure of 1.7 kg/cm$^2$ was trained on a steel drum with a diameter of 1,707.6mm and a width of 350 mm, which was rotated by the driving of a motor, at a speed of 80 km/hr under a load of 425 kg for 30 minutes and thereafter the rotating speed of the drum was raised to 200 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value.

Cornering Stability (Cornering Power)

During the rotating on the drum, a slip angle is gradually given to the tire to produce a cornering force perpendicular to the running direction of the tire. In this way, the cornering power is measured from the cornering force per an initial unit slip angle.

Skid Resistance

The degree of the frictional force between the tire and the road surface in the braking is particularly evaluated by a braking distance on wet road surface.

TABLE 2

| Tire | Rolling resistance | Cornering stability | Skid resistance | Ride feeling |
| --- | --- | --- | --- | --- |
| A | 100 | 100 | 100 | 100 |
| B | 100 | | 85 | |
| C | 93 | 100 | | 95 |

Note:
The properties of the tire A are expressed as an index of 100, respectively. The higher the numerical value, the better the property.

As apparent from Table 2, in the pneumatic radial tire for passenger cars according to the invention, the remarkable reduction of the rolling resistance as well as the improvement of the cornering stability and ride feeling are realized together with the excellent wear resistance without substantially accompanying the deterioration of the skid resistance.

What is claimed is:

1. A pneumatic radial tire for passenger cars having a low rolling resistance, comprising; a toroidal carcass composed of one ply of radially arranged polyester cords, each end portion of said ply being turned around a bead core to form a turnup portion; a belt superimposed about said carcass and comprising plural rubberized plies each containing cords arranged at an inclination angle of 60°-80° with respect to a radial plane of the tire, the cords of said plies being crossed with each other; a bead filler rubber having a dynamic modulus of 700 kg/cm$^2$-1500 kg/cm$^2$ and a Shore A hardness 80°-95° arranged between said carcass and said turnup portion at a region extending from said beaad core to a substantially middle part of a side portion; a tread rubber composed of major parts of styrene-butadiene copolymer rubber and minor parts of polybutadiene rubber and containing a predetermined amount of carbon black ISAF and a base rubber composed of major parts of natural rubber and minor parts of polybutadiene rubber and containing a predetermined amount of carbon black HAF and having a loss modulus of 2 kg/cm$^2$-12 kg/cm$^2$ and a resilience of 60%-85%; said base rubber arranged between said belt and said tread rubber on a volume ratio in said tread rubber of 0.1-0.5 so that said base rubber wraps said belt from one end to the other end over an upper portion thereof.

2. A pneumatic radial tire as claimed in claim 1, wherein a first belt-under cushioning member is arranged between each side edge of said belt and said carcass and has the same properties as used in said base rubber.

3. A pneumatic radial tire as claimed in claim 1, wherein said bead filler rubber is gradually decreased in thickness in a region extending upward from said bead core to a substantially middle part of a side portion, and a sidewall rubber covering said bead reinforcement is thinned in the middle part of said side portion.

4. A pneumatic radial tire as claimed in claim 3, wherein a total gauge of rubber for said side portion including said bead filler rubber is reduced by about 20%.

5. A pneumatic radial tire as claimed in claim 1, wherein said bead filler rubber is composed entirely of natural rubber containing a predetermined amount of carbon black HAF.

6. A pneumatic radial tire as claimed in claim 5, wherein said predetermined amount of carbon black HAF in said bead filler rubber is 75 parts by weight.

7. A pneumatic radial tire as claimed in claim 1, wherein said tread rubber is composed of 80 parts by weight styrene-butadiene copolymer rubber and 20 parts by weight of polybutadiene rubber and said predetermined amount of carbon black ISAF is 75 parts by weight.

8. A pneumatic radial tire as claimed in claim 1 or 7, wherein said base rubber is composed of 80 parts by weight natural rubber and 20 parts by weight polybutadiene rubber and said predetermined amount of carbon black HAF in said base rubber is 38 parts by weight.

9. A pneumatic radial tire as claimed in claim 1, wherein said base rubber extends over 120% of the width of said belt.

10. A pneumatic radial tire as claimed in claim 2, further comprising a second belt-under cushioning member arranged between adjacent plies of said belt.

* * * * *